(12) United States Patent
Castro

(10) Patent No.: US 6,831,927 B1
(45) Date of Patent: Dec. 14, 2004

(54) FAULT PROTECTION FOR HITLESS AND ERRORLESS SWITCHING OF TELECOMMUNICATIONS SIGNALS

(75) Inventor: Peter R. Castro, Howell, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/311,369

(22) Filed: May 13, 1999

(51) Int. Cl.[7] .................................................. H04J 3/24
(52) U.S. Cl. ........................ 370/473; 370/472; 370/473; 370/474
(58) Field of Search ................................ 370/227–228, 370/219–220, 252, 244, 386, 419, 410, 463, 496, 511, 535, 537; 714/52, 48, 703, 757, 799–808

(56) References Cited

U.S. PATENT DOCUMENTS

| | | | |
|---|---|---|---|
| 4,535,442 A | | 8/1985 | Maddern et al. ............ 3370/13 |
| 5,285,441 A | * | 2/1994 | Bansal et al. ............... 370/218 |
| 5,442,647 A | * | 8/1995 | Loebig ....................... 714/807 |
| 5,485,453 A | | 1/1996 | Wahlman et al. ............. 370/16 |
| 5,577,196 A | | 11/1996 | Peer ...................... 395/783.19 |
| 5,610,928 A | | 3/1997 | Maddern et al. ........... 371/37.1 |
| 6,195,330 B1 | * | 2/2001 | Sawey et al. ............... 370/220 |
| 6,246,668 B1 | * | 6/2001 | Kusyk ......................... 370/228 |
| 6,341,129 B1 | * | 1/2002 | Schroeder et al. .......... 370/354 |

* cited by examiner

Primary Examiner—Kwang Bin Yao
Assistant Examiner—Thai Hoang

(57) ABSTRACT

In a distributed switch architecture, each incoming signal is sliced into a plurality of sub-signals. A checksum function is applied to subsets of data in each sub-signal to generate and add a checkbit to the sub-signal for each subset of data. Two copies of the augmented sub-signal are routed in parallel through redundant portions of the distributed switch fabric. Only one of the resulting routed sub-signals is selected for use in generating the corresponding outgoing signal, which is generated by combining data from selected routed sub-signals corresponding to all of the original sub-signals. Checksum analysis is performed on the two routed sub-signals to determine if a fault has occurred. If a fault is detected in the routed sub-signal currently being selected for use in generating the outgoing signal, the selection is changed so that the other routed sub-signal is used. The checkbits are preferably added to the sub-signals in place of terminated overhead data in the transmission format of the incoming signal. By appropriate selection of the size of each subset of data (i.e., if the size is not too small), the number of checkbits added to the sub-signals will not increase the size of the data routed through the distributed switch fabric relative to the size of the data in the transmission format of the incoming signal. In addition, an appropriate selection of the size of each subset of data (i.e., if the size is not too big) ensures that the fault protection scheme of the present invention will satisfy requirements for errorless switching in which the total detection time from a single-point failure is kept within 60 nanosec.

23 Claims, 5 Drawing Sheets

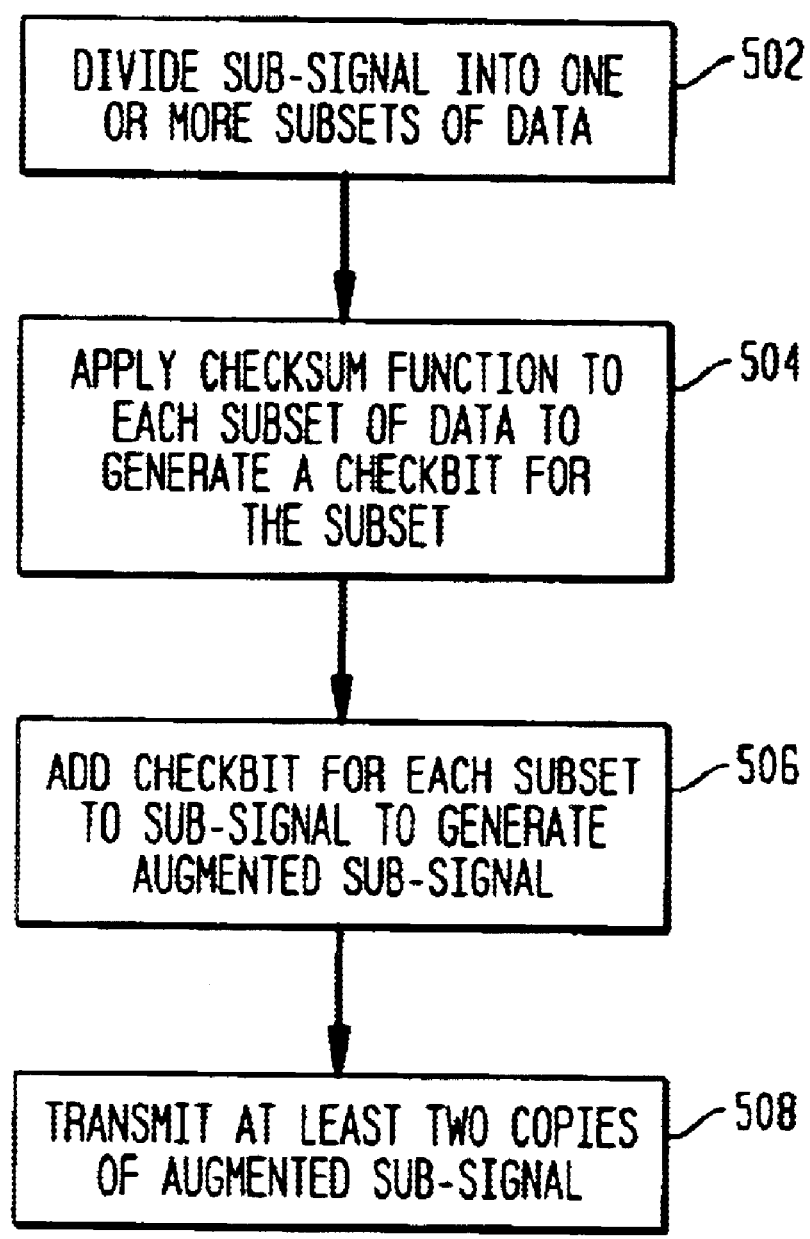

FAULT PROTECTION FOR HITLESS AND ERRORLESS SWITCHING OF TELECOMMUNICATIONS SIGNALS

BACKGROUND OF THE INVENTION

1. Field of the Invention

The present invention relates to signal processing, and, in particular, to the routing of signals through telecommunications systems.

2. Description of the Related Art

A typical telecommunications system has one or more switches that route signals for transmission between end users of the system. Each switch is able simultaneously to receive incoming signals originating at a plurality of different end users and route those received incoming signals for transmission as outgoing signals to a plurality of different destinations (i.e., various end users).

In order to maintain a high quality of communications service, it is very important for the switches of a telecommunications system to operate efficiently and reliably. If a component within a switch of a telecommunications systems fails during on-line routing operations, it is important for the switch to be able to detect that failure within a relatively short period of time and then take actions necessary to ensure that system performance requirements are met. These actions typically involve automatically switching the functional responsibilities from the failed component to a redundant or backup component, typically referred to as a protection component.

If data is lost during these so-called fault protection switching operations, the total recovery time includes the time that it takes to detect the failure plus the time that it takes to perform the protection switching to restore the switch to its full operating capability. If the total recovery time is kept below about 50 msec, such protection switching is referred to as hitless switching, since the human ear can tolerate gaps in telephony service of that duration. If, in addition to a recovery time of less than 50 msec, the switch buffers a sufficient amount of data to ensure that no data is lost during the protection switching, then such protection switching is referred to as errorless switching. In errorless switching, there is technically no recovery time, since there is no loss of data from which to recover. In that case, there is only a detection time, which dictates how much data need to be buffered to ensure errorless switching. The shorter the detection time, the less data need to be buffered, which is typically a desirable goal.

SUMMARY OF THE INVENTION

The present invention is directed to a technique for providing fault protection in a telecommunications switch. The present invention provides a protection switching scheme that can be implemented to keep the detection time below about 60 nanosec, thereby providing hitless switching. If, in addition, the switch buffers an equivalent amount of data, the protection switching can be implemented with no loss of data as errorless switching.

According to the present invention, in a distributed switch architecture, each incoming signal is sliced into a plurality of sub-signals. A checksum function is applied to subsets of data in each sub-signal to generate and add a checkbit to the sub-signal for each subset of data. Two copies of each augmented sub-signal are routed in parallel through redundant portions of the distributed switch fabric. Only one sub-signal from each pair of routed sub-signals is selected for use in generating the corresponding outgoing signal, which is generated by combining data from selected routed sub-signals corresponding to all of the original sub-signals. Checksum analysis is performed on each pair of routed sub-signals to determine if a fault has occurred. If a fault is detected in the routed sub-signal currently being selected for use in generating the outgoing signal, the selection is changed so that the other routed sub-signal is used. The checkbits are preferably added to the sub-signals in place of terminated overhead data in the transmission format of the incoming signal. By appropriate selection of the size of each subset of data (i.e., if the size is not too small), the number of checkbits added to the sub-signals will not increase the size of the data routed through the distributed switch fabric relative to the size of the data in the transmission format of the incoming signal. In addition, an appropriate selection of the size of each subset of data (i.e., if the size is not too big) ensures that, for a single-point failure, the fault protection scheme of the present invention will satisfy requirements for hitless switching in which the detection time and the time needed to implement the protection switching are kept within 50 msec. Furthermore, if the switch buffers a sufficient amount of data, the hitless switching can be implemented without any loss of data as errorless switching.

In one embodiment, the present invention is a method for routing signals in a telecommunications network, comprising the steps of: (a) receiving an incoming signal formatted in a transmission format; (b) slicing data in the incoming signal into a plurality of sub-signals; (c) for each sub-signal: (1) dividing the sub-signal into a plurality of subsets of data; (2) applying a checksum function to each subset of data to generate a checkbit for the subset; (3) adding the checkbit for each subset to the sub-signal to generate an augmented sub-signal; (4) routing at least two copies of the augmented sub-signal in parallel through redundant portions of a distributed switch fabric to generate a set of routed sub-signals for the sub-signal; (5) applying the checksum function to at least a first of the routed sub-signals to perform checksum analysis on the routed sub-signals; (6) selecting one of the routed sub-signals in accordance with the checksum analysis; and (7) providing data from the selected routed sub-signal for use in generating an outgoing signal; and (d) combining data from the selected routed sub-signals corresponding to the plurality of sub-signals to generate the outgoing signal.

In another embodiment, the present invention is, in a telecommunications network, a switch for routing one or more incoming signals received in one or more transmission formats to generate one or more outgoing signals, comprising: (a) a slicer for each incoming signal, wherein the slicer slices data in the incoming signal into a plurality of sub-signals; (b) a checkbit generator for each sub-signal, wherein the checkbit generator: (1) divides the sub-signal into a plurality of subsets of data; (2) applies a checksum function to each subset of data to generate a checkbit for the subset; and (3) adds the checkbit for each subset to the sub-signal to generate at least two copies of an augmented sub-signal; (c) redundant portions of a distributed switch fabric, wherein the redundant portions route in parallel the copies of each augmented sub-signal to generate a set of routed sub-signals for the sub-signal; (d) a fault detector for each set of routed sub-signals, wherein the fault detector: (1) applies the checksum function to at least a first of the routed sub-signals to perform checksum analysis on the routed sub-signals; (2) selects one of the routed sub-signals in accordance with the checksum analysis; and (3) provides data from the selected routed sub-signal for use in generating an outgoing signal; and (e) a combiner for each outgoing signal, wherein the combiner combines data from the selected routed sub-signals corresponding to the plurality of sub-signals to generate the outgoing signal.

BRIEF DESCRIPTION OF THE DRAWINGS

Other aspects, features, and advantages of the present invention will become more fully apparent from the following detailed description, the appended claims, and the accompanying drawings in which:

FIG. 5 shows a flow diagram of the processing of each checkbit generator in FIG. 3, according to one embodiment of the present invention.

DETAILED DESCRIPTION

Figure 1:
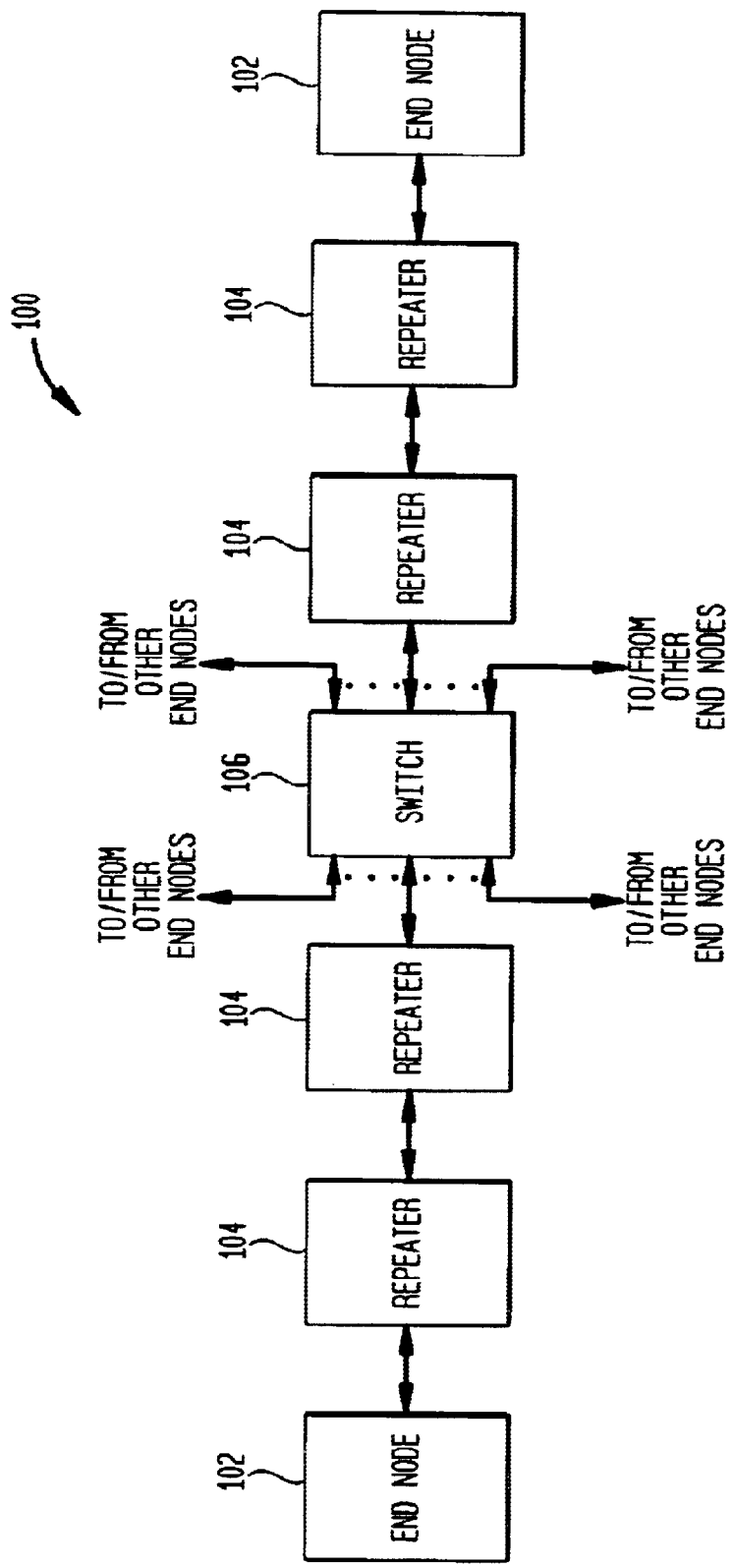
FIG. 1 shows a single path linking two end nodes in a telecommunications system, for purposes of explaining the different types of overhead data that may be included within SONET frames.

In a telecommunications system, different nodes communicate with one another by exchanging signals conforming to a specific transmission protocol. The known transmission protocol enables the switches in such systems to decode information or data contained in the signals in order to perform the necessary routing operations. One known family of transmission protocols conforms to the SONET (Synchronous Optical NETwork) standard for synchronous communications over optical fiber networks. In synchronous communications, signals are transmitted in a continuous, steady stream in which the signals are received in the same temporal sequence in which they were transmitted. The SONET standard defines a number of different formats for encoding data for exchange between network nodes.

One of the SONET formats is based on the STS-1 frame in which data are encoded into a matrix consisting of 8-bit byte-size elements arranged in 9 rows and 90 columns, in which the first 3 columns are reserved for overhead data and the remaining 87 columns are used for both overhead and payload data. Each STS-1 frame is transmitted in 125 microseconds at a fiber data rate of 51.84 megabits/second (Mb/s), referred to as the OC-1 data rate.

Another SONET format is based on the STS-3 frame in which data are encoded into a matrix consisting of 9 rows and 270 columns, in which the first 9 columns are reserved for overhead data and the remaining 261 columns are used for both overhead and payload data. Each STS-3 frame is transmitted in 125 microseconds at the OC-3 fiber data rate of 155.52 Mb/s.

Yet another SONET format is based on the STS-12 frame in which data are encoded into a matrix consisting of 9 rows and 1080 columns, in which the first 36 columns are reserved for overhead data and the remaining 1044 columns are used for both overhead and payload data. Each STS-12 frame is transmitted in 125 microseconds at the OC-12 fiber data rate of 622.08 Mb/s.

Still another SONET format is based on the STS-48 frame in which data are encoded into a matrix consisting of 9 rows and 4320 columns, in which the first 144 columns are reserved for overhead data and the remaining 4176 columns are used for both overhead and payload data. Each STS-48 frame is transmitted in 125 microseconds at the OC-48 fiber data rate of 2488.32 Mb/s.

The available data rate dictates which SONET frame format is used. In each of the SONET formats, the data encoded in the corresponding SONET frames are transmitted sequentially within each row from left to right and row by row from top to bottom.

FIG. 1 shows a single path 100 linking two end nodes 102 (e.g., two telephones) in a telecommunications system, for purposes of explaining the different types of overhead data that are allocated within SONET frames. At the center of path 100, is a switch 106 that handles the routing of signals between numerous pairs of end nodes, including end nodes 102. In addition, connected between switch 106 and each end node 102, path 100 may have a number of repeaters 104 that act as amplifiers for the transmitted signals.

Signals transmitted within a telecommunications system having paths such as path 100 of FIG. 1 may contain three different types of overhead data: path data, line data, and section data. Path data refers to overhead data communicating information between end nodes (e.g., 102) of the telecommunications system. Line data refers to overhead data communicating information between an end node (e.g., 102) and a switch (e.g., 106) internal to the telecommunications system. Section data refers to overhead data communicating information between an end node (e.g., 102) and a repeater (e.g., 104) internal to the telecommunications system, between two repeaters (e.g., 104), or between a repeater (e.g., 104) and a switch (e.g., 106). Overhead data in each of the different SONET formats includes path data, line data, and section data.

Independent of which particular SONET format is used, when signals arrive at a switch of a telecommunications system, such as switch 106 of FIG. 1, some of the overhead data contained in each SONET frame are terminated. Overhead data is said to be terminated when the overhead data correspond to information that is decoded and used by the receiving component to process and route the received signal. After being processed (i.e., routed) within the switch, the switch adds appropriate overhead data back into the routed data before re-transmitting the outgoing signals to their respective destinations.

Figure 2:
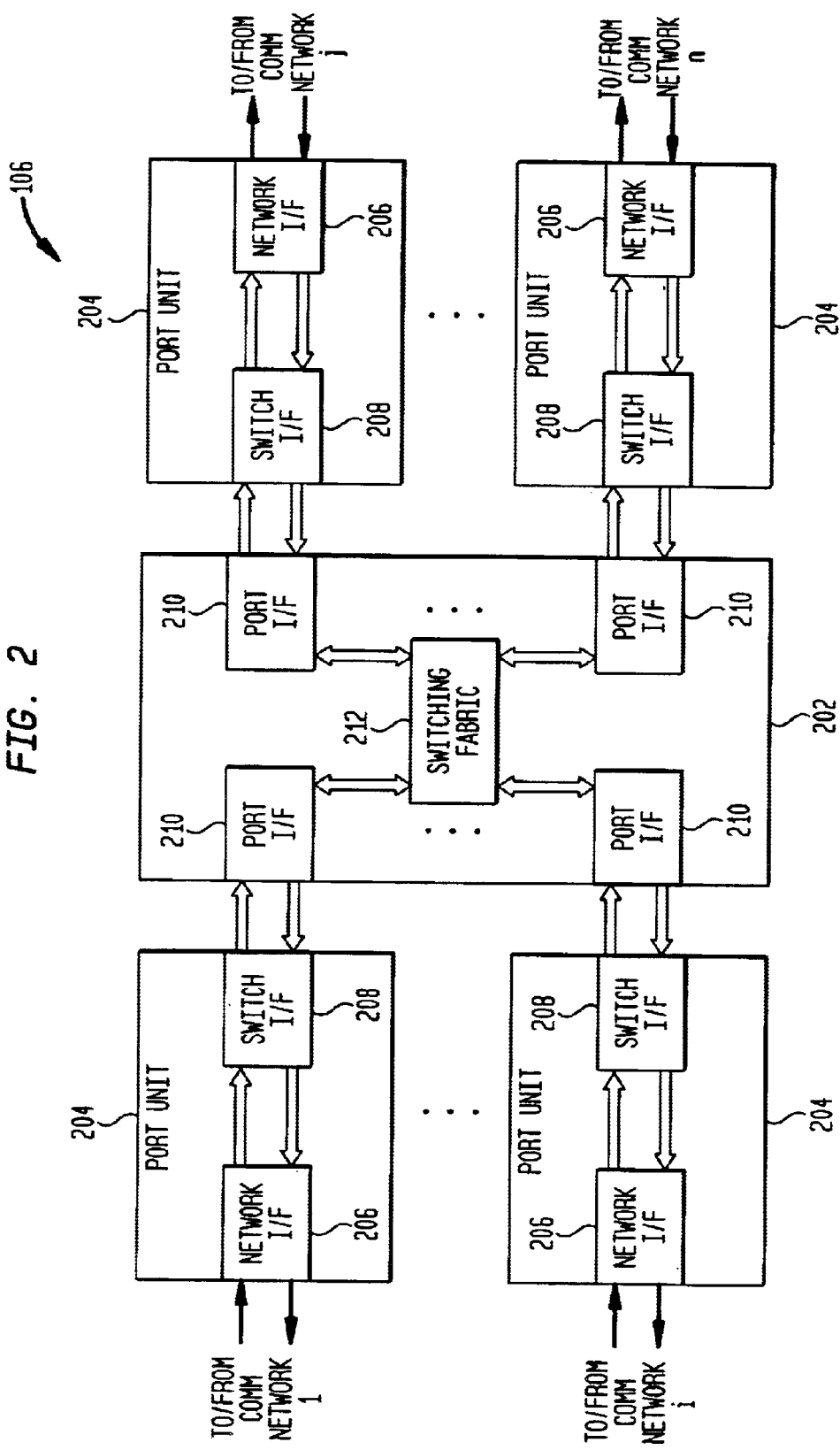
FIG. 2 shows a hardware block diagram of the telecommunications switch of FIG. 1, according to one embodiment of the present invention.

FIG. 2 shows a hardware block diagram of telecommunications switch 106 of FIG. 1, according to one embodiment of the present invention. Switch 106 comprises broadband switch (BBSW) 202 and a number of port units 204. When switch 106 is configured to provide the interface between different communication networks, each port unit 204 provides the interface between BBSW 202 and a particular communication network. In particular, each port unit 204 has (a) a network interface 206 that handles the transmission and receipt of signals to and from the corresponding communication network and (b) a high-speed switch interface 208 that handles the transmission and receipt of signals to and from BBSW 202.

For each port unit 204, broad-band switch 202 has a high-speed port interface 210 that handles the transmission and receipt of signals to and from that port unit. BBSW 202 also has switching fabric 212, which performs the actual routing of signals for the different communication networks. In general, each communication network corresponding to one of the port units 204 may be—but does not need to be—independent of every other communication network. As such, switch 106 can be configured to conform to one or more different network transmission protocols.

According to the present invention, all network-dependent communication signals received by switch 106 are converted by port units 204 into a single internal frame format for purposes of routing the signals through switching fabric 212. In one embodiment of the present invention, the internal frame format for switching fabric 212 is based on the general structure of the conventional SONET frames.

When a port unit 204 of switch 106 receives signals from its corresponding communication network, some of the overhead data contained in the received signals are terminated. After being processed (i.e., routed) by switching fabric 212, the port units 204 add appropriate overhead data back into the routed data before the port units 204 re-transmit the outgoing signals to their respective communication networks. As such, there is no need to reserve fields corresponding to the terminated overhead data while the rest of the data are being routed through switching fabric 212.

As shown in FIG. 2, telecommunications switches are typically designed to handle simultaneously the routing of a number of different incoming signals. In order to avoid unnecessary processing delays, switches like switch 106 are typically designed with a distributed architecture having multiple sets of switch components, each of which processes in parallel a different portion of the data in each incoming signal. For each incoming signal, the corresponding port unit has a slicer that performs a demultiplexing operation to slice the corresponding incoming signal into multiple data streams, one stream for each set of switch components, where each stream contains a portion of the data in the incoming signal. Each set of switch components receives data from each slicer for each incoming signal and performs routing processing on those data. In addition, each port unit has a combiner for each outgoing signal transmitted by the switch. Each combiner receives a portion of the data processed by each set of switch components and performs a multiplexing operation to combine those data into a single outgoing signal. Such telecommunications switches are referred to as distributed switches.

According to the present invention, incoming signals received at a switch in a transmission format (e.g., a standard SONET format) are reformatted into a special switch format for purposes of the routing processing that is performed within the switch. The routed signals are then reformatted again (possibly but not necessarily into the same transmission format as the incoming signal) for transmission from the switch as outgoing signals. According to the present invention, the special switch format is designed to take advantage of the fact that certain overhead data in the transmission format are terminated at the input to the switch, thereby freeing up bandwidth in the routed signal streams for the inclusion of additional bits that are used to provide fault protection within the switch.

Figure 3:
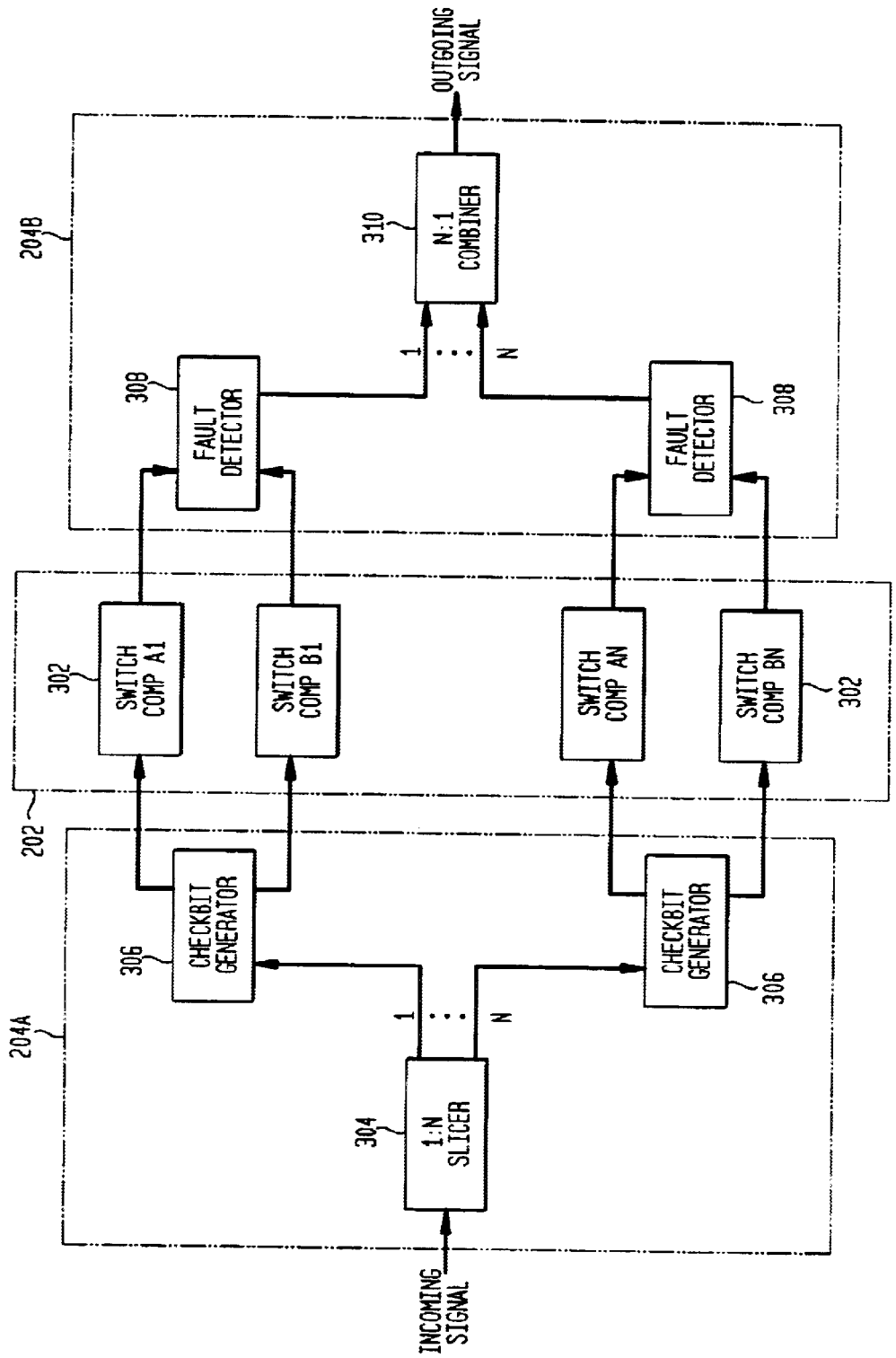
FIG. 3 shows a functional block diagram of a portion of the switch of FIG. 2 indicating the processing for one incoming signal and one outgoing signal, according to one embodiment of the present invention.

FIG. 3 shows a functional block diagram of a portion of switch 106 of FIG. 2 indicating the processing for one incoming signal and one outgoing signal, according to one embodiment of the present invention. Broadband switch 202 has a fully redundant switch fabric comprising two sets (set A and set B) of N switching components 302. Port unit 204A has a 1:N slicer 304 and N checkbit generators 306. Similarly, port unit 204B has N fault detectors 308 and an N:1 combiner 310. In a typical implementation, each port unit 204 in FIG. 2 will contain the components of both port unit 204A and port unit 204B. For illustrative purposes, the functionality related to the processing an incoming signal (i.e., port unit 204A) is depicted in FIG. 3 in a different port unit from the functionality related to the processing of an outgoing signal (i.e., port unit 204B).

Slicer 304 performs a demultiplexing operation that slices the incoming signal into N sub-signals, each of which contains a different portion of the incoming signal. In one embodiment, slicer 304 performs byte slicing in which the incoming signal is divided byte by byte into the N sub-signals, such that the first sub-signal contains the $\{1^{st}, (N+1)^{th}, (2N+1)^{th}, \ldots\}$ bytes of the incoming signal, the second sub-signal contains the $\{2^{nd}, (N+2)^{th}, (2N+2)^{th}, \ldots\}$ bytes of the incoming signal, and so on, such that the $N^{th}$ sub-signal contains the $\{N^{th}, 2N^{th}, 2N^{th}, \ldots\}$ bytes of the incoming signal. Other techniques for slicing, such as bit slicing, are also possible.

For each of the N sub-signals, the corresponding checkbit generator 306 applies a parity operation or other appropriate checksum function on each set of M consecutive bytes in the sub-signal to generate and add P checkbits (P24 1) to the sub-signal stream for each M bytes. Two identical versions of the resulting augmented sub-signal (i.e., data+checkbits) are processed in parallel by a pair of corresponding redundant switch components 302 in the switch fabric: one from set A and one from set B.

FIG. 5 shows a flow diagram of the processing of each checkbit generator 306 in FIG. 3, according to one embodiment of the present invention. In particular, checkbit generator 306 divides the corresponding sub-signal into one or more subsets of data (step 502 of FIG. 5), applies a checksum function to each subset of data to generate a checkbit for the subset (step 504), adds the checkbit for each subset to the sub-signal to generate an augmented sub-signal (step 506), and transmits at least two copies of the augmented sub-signal (step 508) for routing in parallel through redundant portions of a distributed switch fabric to generate at least two routed sub-signals for the sub-signal.

Each resulting pair of routed sub-signals are then transmitted to a corresponding fault detector 308, which applies the same checksum function implemented by checkbit generator 306 on each subset of data in one or both of the routed sub-signals, depending on the implementation. For each subset of data, the resulting P checkbits are then compared to the P checkbits in the corresponding routed sub-signal to determine whether or not an error has occurred in the corresponding path through broadband switch 202. During normal operations, the two corresponding redundant switch components 302 in sets A and B will both be functioning properly, and the parity analysis (if applied to both routed sub-signals) would determine that both sub-signals are free of errors. Only after the (hopefully) rare occurrence of a failure or other fault in one of the processing paths will one of the sub-signals fail the parity analysis. In either case, fault detector 308 removes the checkbits from an error-free sub-signal and passes the resulting sub-signal to combiner 310, which also receives error-free sub-signals from the other (N−1) fault detectors 308 and performs a multiplexing operation to interleave data from the N routed sub-signals into a single composite outgoing signal.

In typical operations, initially, one set of switch components is designated as the working set, while the other set is designated as the protection set. For example, when set A is the working set and set B is the protection set, each fault detector 308 is initialized to select the sub-signal routed by the corresponding switch component 302 in set A for checkbit removal and transmission to combiner 310. Depending on the implementation, when a fault is detected in a particular working switch component 302, one option is to perform protection switching for the entire set of switch components 302 by changing the sub-signal selections performed by all N fault detectors 308 from the working set to the protection set.

Another option is to perform protection switching only for the faulty switch component 302. In the example where set A is the working set, after a fault is detected in a particular switch component 302 in set A, the corresponding fault detector 308 will switch its selection to the sub-signal routed by the corresponding switch component 302 in set B, while the remaining (N−1) fault detectors 308 will maintain their selections of the switch components 302 in set A. This latter implementation enables switch 106 to recover from up to N different single-point failures, as long as each failure corresponds to a different sub-signal generated by slicer 304.

As indicated in FIG. 2, switch 106 may receive multiple incoming signals and transmit multiple outgoing signals. For each incoming signal, a port unit 204 in switch 106 has a 1:N slicer similar to slicer 304 of FIG. 3 and N checkbit generators similar to checkbit generators 306. Similarly, for each outgoing signal, a port unit 204 in switch 106 has N fault detectors similar to fault detectors 308 and an N:1 combiner similar to combiner 310. Each switch component 302 in broadband switch 202 receives a corresponding sub-signal from each incoming signal and generates a corresponding routed sub-signal for each outgoing signal. In particular, for example, each of switch components A1 and B1 receives a copy of the $1^{st}$ sub-signal from each incoming signal and generates a routed version of the $1^{st}$ sub-signal for each outgoing signal, while each of switch components AN and BN receives a copy of the $N^{th}$ sub-signal from each incoming signal and generates a routed version of the $N^{th}$ sub-signal for each outgoing signal.

Figure 4:
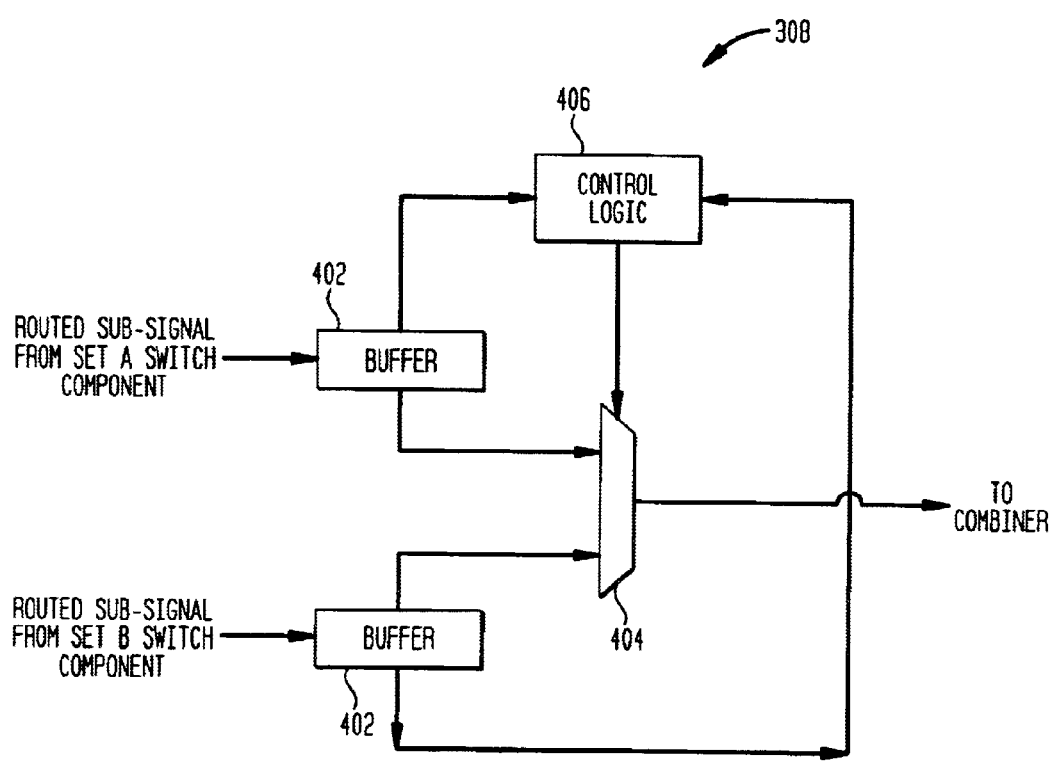
FIG. 4 shows a block diagram of each fault detector in FIG. 3, according to one embodiment of the present invention.

FIG. 4 shows a block diagram of each fault detector 308 in FIG. 3, according to one embodiment of the present invention. For the corresponding routed sub-signal, each buffer 402 buffers data corresponding to each M consecutive bytes of the original sub-signal plus the P checkbits that were added to the sub-signal by checkbit generator 306 of FIG. 3 for those M bytes. Multiplexer 404 transmits one of the two sets of M bytes to the corresponding combiner, based on a control signal generated by control logic 406. Depending on the implementation, for one or both of the two sets of buffered data, control logic 406 applies the checksum function to the M bytes and compares the resulting P checkbits to the P routed checkbits to determine if a failure has occurred. If control logic 406 determines that the sub-signal currently being selected by mux 404 fails the checksum analysis (i.e., the generated checksum bits do not match the routed checksum bits), then control logic 406 changes the control signal to instruct mux 404 to select the other sub-signal, assuming that the other sub-signal passes the checksum analysis or is otherwise accepted as accurate.

According to the present invention, the incoming signal is reformatted from its original transmission format into a special internal format for routing through broadband switch 202 such that certain overhead data that are terminated at the network side of the corresponding port unit 204 are replaced by the checkbits added by the various checkbit generators 306. In this way, the present invention requires no additional processing bandwidth to be added to broadband switch 202, thereby enabling the present invention to be implemented using existing switch fabric technology.

In one particular implementation of switch 106 according to the present invention, N is 32, M is 12, and P is 1. With N=32, each port unit 204A has (i) a 1:32 slicer 304 that slices its incoming signal into 32 sub-signals and (ii) 32 corresponding checkbit generators 306. In addition, the switch fabric of broadband switch 202 has two sets of 32 switch components, and each port unit 204B has 32 fault detectors 308 and a 32:1 combiner 310 that combines the 32 selected routed sub-signals into the corresponding outgoing signal. With M=12 and P=1, each checkbit generator 306 buffers 12 bytes (i.e., 96 bits) of sub-signal data, applies an appropriate checksum function, and adds a single checkbit to the sub-signal stream for each 96-bits of data. Similarly, each fault detector 308 buffers 97 bits of routed sub-signal data, applies the checksum function to the 96 bits corresponding to the original sub-signal data, and compares the resulting checkbit to the routed checkbit (i.e., the $97^{th}$ bit) to determine whether a failure has occurred somewhere in the corresponding path through broadband switch 302.

In one implementation of switch 106 of FIG. 1 in which the switch data rate is 155 Mbits/sec, by adding a checkbit every 12 bytes, the total detection time can be kept within about 60 nanosec (i.e., roughly the time required to process 12 bytes of data at a data rate of 155 Mbits/sec). When the switch buffers at least 60 nanoseconds worth of data, fault protection according to the present invention can guarantee errorless switching. Moreover, when the transmission format of the incoming data conforms to a SONET STS-1 frame format having 9*90 or 810 bytes, adding a single checkbit every 12 bytes is equivalent to adding less than 9 bytes worth of checkbits per STS-1 frame, which is less than the 10 bytes of overhead data that are terminated per STS-1 frame prior to processing the data through the switch. This ensures that there is enough room to add the checkbits without increasing the overall amount of data to be processed by the switch. Analogous results hold for larger SONET frames, in which there are more bytes worth of checkbits, but also sufficiently more bytes of terminated overhead data.

While the exemplary embodiments of the present invention have been described with respect to processes of circuits, the present invention is not so limited. As would be apparent to one skilled in the art, various functions of circuit elements may also be implemented in the digital domain as processing steps in a software program. Such software may be employed in, for example, a digital signal processor, micro-controller or general purpose computer.

The present invention can be embodied in the form of methods and apparatuses for practicing those methods. The present invention can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

It will be further understood that various changes in the details, materials, and arrangements of the parts which have been described and illustrated in order to explain the nature of this invention may be made by those skilled in the art without departing from the scope of the invention as expressed in the following claims.

What is claimed is:

1. A method for routing signals in a switch of a telecommunications network, comprising the steps of:
   (a) receiving an incoming signal at the switch;
   (b) slicing data in the received incoming signal into a plurality of sub-signals, wherein the plurality of sub-signals are processed in parallel by, for each sub-signal:
      (i) dividing the sub-signal into one or more subsets of data;
      (ii) applying a checksum function to each subset of data to generate a checkbit for the subset;
      (iii) adding the checkbit for each subset to the sub-signal to generate an augmented sub-signal;
      (iv) by routing at least two copies of the augmented sub-signal in parallel through redundant portions of a distributed switch fabric of the switch to generate at least two routed sub-signals for the sub-signal, wherein the distributed switch fabric has multiple switch components adapted to route different portions of each of a plurality of incoming signals in parallel;
      (v) performing a checksum analysis on at least one of the routed sub-signals; and
      (vi) selecting one of the routed sub-signals in accordance with the checksum analysis; and
   (c) combining data from the selected routed sub-signals corresponding to the plurality of sub-signals to generate an outgoing signal.

2. The invention of claim 1, wherein step (a) comprises the step of terminating overhead data in the received incoming signal, wherein the checkbits replace at least some of the terminated overhead data during routing through the distributed switch fabric.

3. The invention of claim 2, wherein the size of each subset of data in each sub-signal is selected such that the addition of the checkbits does not increase the size of the augmented sub-signal routed through the distributed switch fabric relative to the size of corresponding sub-signal.

4. The invention of claim 3, wherein the incoming signal is in a SONET format and further comprising the step of buffering a sufficient amount of data to ensure errorless protection switching upon detection of a fault during the checksum analysis.

5. The invention of claim 4, wherein the selection of routed sub-signals for each sub-signal for the incoming signal is independent of the selection of routed sub-signals for each other sub-signal for the incoming signal.

6. The invention of claim 4, wherein the selection of routed sub-signals for any one sub-signal for the incoming signal affects the selection of routed sub-signals for all other sub-signals for the incoming signal.

7. The invention of claim 1, wherein the incoming signal is in a SONET format.

8. The invention of claim 1, wherein the selection of routed sub-signals each sub-signal for the incoming signal is independent of the selection of routed sub-signals for each other sub-signal for the incoming signal.

9. The invention of claim 1, wherein the selection of routed sub-signals for any one sub-signal for the incoming signal affects the selection of routed sub-signals for all other sub-signals for the incoming signal.

10. The invention of claim 1, further comprising the step of buffering a sufficient amount of data to ensure errorless protection switching upon detection of a fault during the checksum analysis.

11. An switch for routing signals in a telecommunications network, comprising:
   (a) means for receiving an incoming signal at the switch;
   (b) means for slicing data in the received incoming signal into a plurality of sub-signals, wherein the plurality of sub-signals are processed in parallel by, for each sub-signal:
      (i) means for dividing the sub-signal into one or more subsets of data;
      (ii) means for applying a checksum function to each subset of data to generate a checkbit for the subset;
      (iii) means for adding the checkbit for each subset to the sub-signal to generate an augmented sub-signal;
      (iv) means for routing at least two copies of the augmented sub-signal in parallel through redundant portions of a distributed switch fabric of the switch to generate at least two routed sub-signals for the sub-signal, wherein the distributed switch fabric has multiple switch components adapted to route different portions of each of a plurality of incoming signals in parallel;
      (v) means for performing a checksum analysis on at least one of the routed sub-signals; and
      (vi) means for selecting one of the routed sub-signals in accordance with the checksum analysis; and
   (c) means for combining data from the selected routed sub-signals corresponding to the plurality of sub-signals to generate an outgoing signal.

12. In a telecommunications network, a switch for routing one or more incoming signals to generate one or more outgoing signals, comprising:
   (a) a slicer for each incoming signal, wherein the slicer slices data in the incoming signal into a plurality of sub-signals, wherein the plurality of sub-signals are processed in parallel by:
      a checkbit generator for each sub-signal, wherein the checkbit generator:
         (i) divides the sub-signal into a plurality of subsets of data;
         (ii) applies a checksum function to each subset of data to generate a checkbit for the subset; and
         (iii) adds the checkbit for each subset to the sub-signal to generate at least two copies of an augmented sub-signal;
      redundant portions of a distributed switch fabric, wherein the redundant portions route in parallel the copies of each augmented sub-signal to generate at least two routed sub-signals for the sub-signal, wherein the distributed switch fabric has multiple switch components adapted to route different portions of each of a plurality of incoming signals in parallel, and;
      a fault detector for each set of routed sub-signals, wherein the fault detector:
         (i) performs a checksum analysis on at least one of the routed sub-signals; and
         (ii) selects one of the routed sub-signals in accordance with the checksum analysis; and
   (b) a combiner for each outgoing signal, wherein the combiner combines data from the selected routed sub-signals corresponding to the plurality of sub-signals to generate the outgoing signal.

13. The invention of claim 12, wherein the switch is adapted to terminate overhead data in the received incoming signal, wherein the checkbits replace at least some of the terminated overhead data during routing through the distributed switch fabric.

14. The invention of claim 13, wherein the size of each subset of data in each sub-signal is selected such that the addition of the checkbits does not increase the size of the augmented sub-signal routed through the distributed switch fabric relative to the size of the corresponding sub-signal.

15. The invention of claim 14, wherein the incoming signal is in a SONET format and further comprising buffers configured to buffer a sufficient amount of data to ensure errorless protection switching upon detection of a fault by the fault detector.

16. The invention of claim 15, wherein the selection of routed sub-signals for each sub-signal for the incoming signal is independent of the selection of routed sub-signals for each other sub-signal for the incoming signal.

17. The invention of claim 15, wherein the selection of routed sub-signals for any one sub-signal for the incoming signal affects the selection of routed sub-signals for all other sub-signals for the incoming signal.

18. The invention of claim 12, wherein the incoming signal is in a SONET format.

19. The invention of claim 12, wherein the selection of routed sub-signals for each sub-signal for the incoming signal is independent of the selection of routed sub-signals for each other sub-signal for the incoming signal.

20. The invention of claim 12, wherein the selection of routed sub-signals for any one sub-signal for the incoming signal affects the selection of routed sub-signals for all other sub-signals for the incoming signal.

21. The invention of claim 12, further comprising buffers configured to buffer a sufficient amount of data to ensure errorless protection switching upon detection of a fault by the fault detector.

22. The invention of claim 1, wherein each augmented sub-signal is the same size as the corresponding sub-signal.

23. The invention of claim 12, wherein each augmented sub-signal is the same size as the corresponding sub-signal.

* * * * *